US010099585B2

United States Patent
Akaike et al.

(10) Patent No.: US 10,099,585 B2
(45) Date of Patent: Oct. 16, 2018

(54) VEHICLE SEAT

(71) Applicant: TOYOTA BOSHOKU KABUSHIKI KAISHA, Aichi-ken (JP)

(72) Inventors: Fumitoshi Akaike, Aichi-ken (JP); Hisato Konai, Aichi-ken (JP); Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/487,931

(22) Filed: Apr. 14, 2017

(65) Prior Publication Data

US 2017/0313227 A1    Nov. 2, 2017

(30) Foreign Application Priority Data

Apr. 28, 2016    (JP) .................. 2016-090910

(51) Int. Cl.
    *A47C 7/02* (2006.01)
    *B60N 2/70* (2006.01)
    *B60N 2/68* (2006.01)

(52) U.S. Cl.
    CPC .......... *B60N 2/70* (2013.01); *B60N 2/68* (2013.01)

(58) Field of Classification Search
    CPC .................. B60N 2/70; B60N 2/68
    USPC .................. 297/452.18
    See application file for complete search history.

(56) References Cited

U.S. PATENT DOCUMENTS

| 4,357,005 | A  | * | 11/1982 | Bourke | B60N 2/7094 |
|           |    |   |         |        | 267/142 |
| 6,499,806 | B2 | * | 12/2002 | Nagayasu | A47C 7/28 |
|           |    |   |         |        | 29/428 |
| 9,776,545 | B1 | * | 10/2017 | Lovasz | B60N 2/72 |
| 2004/0004386 | A1 | * | 1/2004 | Guillot | A47C 7/30 |
|              |    |   |        |         | 297/452.52 |
| 2006/0152063 | A1 | * | 7/2006 | Nagayama | B60N 2/1615 |
|              |    |   |        |          | 297/452.49 |
| 2009/0184552 | A1 | * | 7/2009 | Vanparys | A47C 7/465 |
|              |    |   |        |          | 297/284.4 |
| 2010/0133732 | A1 | * | 6/2010 | Yamaguchi | B60N 2/002 |
|              |    |   |        |           | 267/140.4 |
| 2011/0004371 | A1 | * | 1/2011 | Bullard | A47C 7/285 |
|              |    |   |        |         | 701/36 |

(Continued)

FOREIGN PATENT DOCUMENTS

JP    2014-171506    9/2014

*Primary Examiner* — Mark R Wendell

(74) *Attorney, Agent, or Firm* — Greenblum & Bernstein, P.L.C.

(57) ABSTRACT

A vehicle seat including: a seat frame forming a framework of the vehicle seat; and a wire connected to the seat frame and to which an axial force in an axial direction thereof is configured to be applied, wherein a bent portion or a diameter-enlarged portion is provided to at least one end portion of the wire, wherein a flat part of the seat frame is provided with a locking portion into which the bent portion or the diameter-enlarged portion is inserted and which is configured to receive the axial force in an in-plane direction, and wherein a separation preventing member is attached to the flat part and prevents the wire from being separated from the flat part in a state where the bent portion or the diameter-enlarged portion is inserted into the locking portion.

10 Claims, 4 Drawing Sheets

(56) References Cited

U.S. PATENT DOCUMENTS

| | | | |
|---|---|---|---|
| 2012/0292961 A1* | 11/2012 | Nitsuma | B60N 2/4228 297/216.14 |
| 2013/0119715 A1* | 5/2013 | Medoro | B60N 2/686 297/180.1 |
| 2013/0119742 A1* | 5/2013 | Wiegelmann | B60N 2/54 297/452.18 |
| 2015/0183354 A1* | 7/2015 | Fushikida | B60N 2/68 297/452.18 |
| 2015/0352981 A1* | 12/2015 | Nagayasu | B60N 2/68 297/313 |
| 2016/0039323 A1* | 2/2016 | Hoshi | B60N 2/72 297/452.18 |
| 2016/0325649 A1* | 11/2016 | Sugiyama | B60N 2/90 |
| 2017/0066356 A1* | 3/2017 | Niwa | B60N 2/7094 |
| 2017/0320417 A1* | 11/2017 | Ito | B60N 2/68 |

* cited by examiner

VEHICLE SEAT

CROSS-REFERENCE TO RELATED APPLICATIONS

This application claims priority from Japanese Patent Application No. 2016-090910 filed on Apr. 28, 2016, the entire contents of which are incorporated herein by reference.

TECHNICAL FIELD

The disclosure relates to a vehicle seat.

BACKGROUND

There is a vehicle seat in which a pad support wire for placing and supporting a cushion pad serving as a cushion material is connected to a cushion frame main body. In the technology disclosed in JP-A-2014-171506, a front end portion of a pad support wire extending in a front and rear direction is connected to a front panel by welding, and a rear end portion thereof is formed in a hook shape and is hooked and attached to a rear pipe.

In a case where an end portion of the pad support wire is to be connected to a flat part such as a panel part of the cushion frame by welding, a thin wire is welded to a plate material. Therefore, it is necessary to increase a welding length in order to secure strength. Further, in a case where an engaging portion provided to an end portion of the pad support wire is to be hooked and attached to an engaged portion provided to the flat part of the cushion frame, there is a problem that the structure tends to be complicated because it is necessary to form the engaging portion and the engaged portion and to prevent the coming off.

SUMMARY

The disclosure has been made in consideration of the above problems and an object thereof is to provide a vehicle seat in which a wire is attached to a flat part such as a panel part of a seat frame so as to secure attachment strength with a simple structure.

According to an aspect of the disclosure, there is provided a vehicle seat including: a seat frame forming a framework of the vehicle seat; and a wire connected to the seat frame and to which an axial force in an axial direction thereof is configured to be applied, wherein a bent portion or a diameter-enlarged portion is provided to at least one end portion of the wire, wherein a flat part of the seat frame is provided with a locking portion into which the bent portion or the diameter-enlarged portion is inserted and which is configured to receive the axial force in an in-plane direction, and wherein a separation preventing member is attached to the flat part and prevents the wire from being separated from the flat part in a state where the bent portion or the diameter-enlarged portion is inserted into the locking portion.

Accordingly, the bent portion or the diameter-enlarged portion is provided to the at least one end portion of the wire, and the locking portion is provided to the flat part of the seat frame. As the bent portion or the diameter-enlarged portion is locked to the locking portion, the axial force applied to the wire can be transmitted in the in-plane direction of the flat part of the seat frame. Further, the separation preventing member is attached to the wire so that the wire in this state is not separated from the flat part of the seat frame. In this way, the wire can stably transmit the axial fore to the seat frame, and thus, the attachment strength can be secured with a simple structure. Here, the "flat part" used herein includes not only the flat part of the panel member but also one plane portion of a closed section part of the panel member.

DETAILED DESCRIPTION

FIGS. 1 to 4 show an example where the disclosure is applied to an automobile seat 1 according to one embodiment of the disclosure. In each of the figures, respective directions of an automobile when the automobile seat 1 is mounted on a floor F of the automobile are indicated by arrows. In the following, the description relating to directions is made with reference to these directions. The automobile seat 1 corresponds to the "vehicle seat" in the claims.

Figure 1:
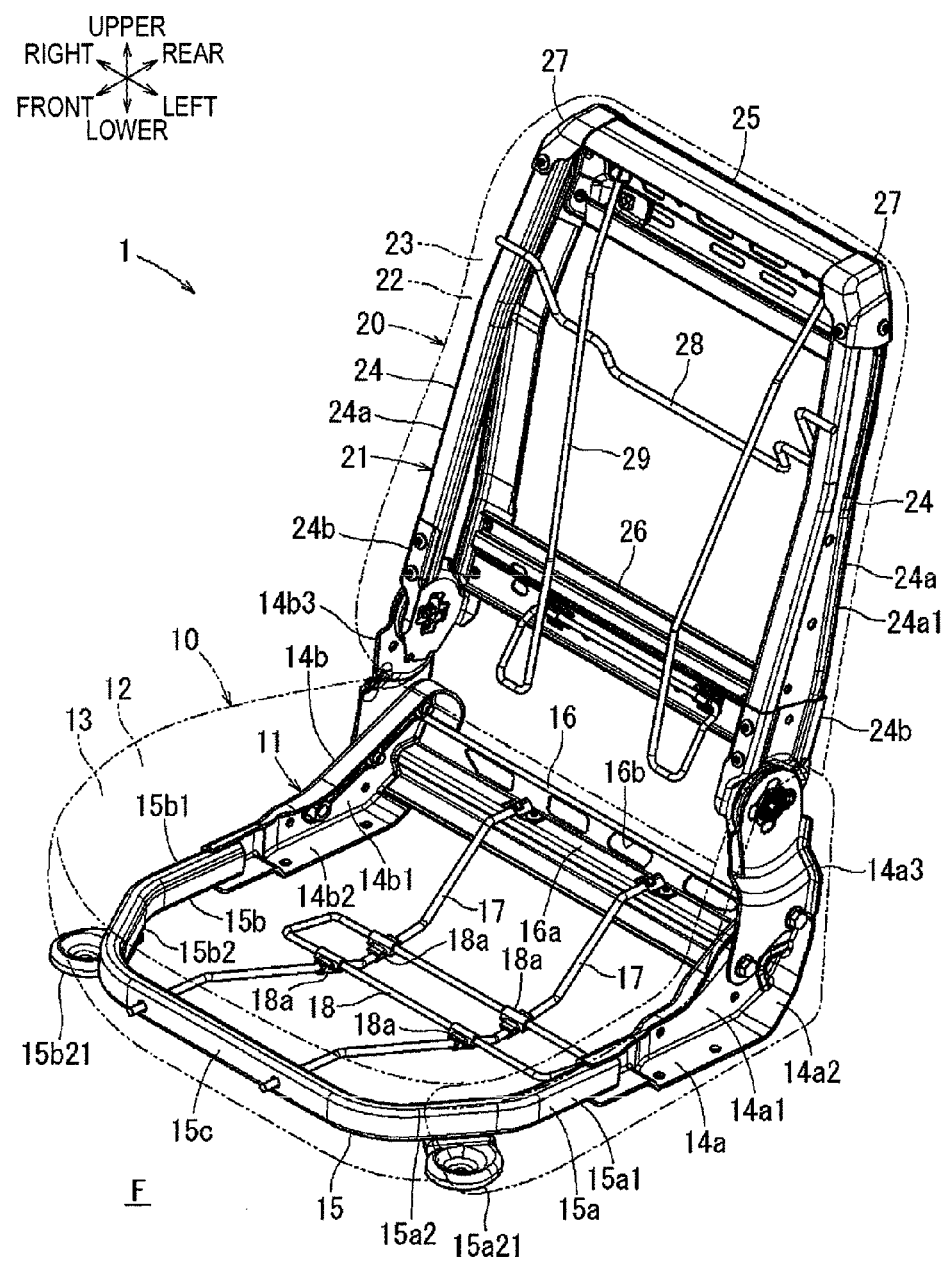
FIG. 1 is a perspective view showing a configuration of an automobile seat according to one embodiment of the disclosure.

As shown in FIG. 1, a seat cushion 10 includes a cushion frame 11 forming a framework, a cushion pad 12 serving as a cushion material, and a cushion cover 13 serving as a skin material. A seat back 20 includes a back frame 21 for forming a framework, a back pad 22 that is a cushion material, and a back cover 23 that is a skin material. The cushion frame 11 corresponds to the "seat frame" in the claims.

As shown in FIG. 1, the cushion frame 11 includes left and right side frames 14a, 14b extending in a front and rear direction, a front frame 15, and a rear frame 16. A front end portion side of each of the left and right side frames 14a, 14b is connected to the front frame 15 and a rear end portion side thereof is connected to the rear frame 16, thereby forming a substantially rectangular shape, as seen in a plan view. The left side frame 14a is a press-molded part of aluminum. The left side frame 14a includes a vertical plate part 14a1 extending perpendicularly to the floor F in a front and rear direction and a flange part 14a2 extending leftward from an upper end portion, a lower end portion and a rear end portion of the vertical plate portion 14a1. The right side frame 14b is a press-molded part of aluminum. The right side frame 14b includes a vertical plate part 14b1 extending perpendicularly to the floor F in the front and rear direction and a flange part 14b2 extending leftward from an upper end portion, a lower end portion and a rear end portion of the vertical plate portion 14b1. The front frame 15 is a member obtained by bending an aluminum extrusion-molded tubular member having a substantially rectangular cross-section into a substantially U shape opened rearward, as seen in a plan view. A left part 15a that is one part on the opening side of the U shape is configured such that a rear end portion side is formed as a rear left portion 15a1 extending in the front and rear direction and a front end portion side is formed as a front left portion 15a2 to be bent rightward from a front end of the rear left portion 15a1. Further, a right part 15b that is the other part on the opening side of the U shape is configured such that a rear end portion side is formed as a rear right portion 15b1 extending in the front and rear direction and a front end portion side is formed as a front right portion 15*b*2 to be bent leftward from a front end of the rear right portion 15*b*1. A front end portion of the front left portion 15*a*2 of the left part 15*a* and a front end portion of the front right portion 15*b*2 of the right part 15*b* are connected by a front portion 15*c* and integrally formed. A bracket 15*a*21 is connected to the left of the front left portion 15*a*2 of the left part 15*a* by welding, and a bracket 15*b*21 is connected to the right of the front right portion 15*b*2 of the right part 15*b* by welding. The rear frame 16 is a press-molded part of aluminum, which has a constant section. The rear frame 16 has a flat surface portion 16*a* that extends in parallel with the floor F when connected to the left side frame 14*a* and the right side frame 14*b*. Four lightening holes 16*b* are provided at predetermined portions of the rear frame 16. Here, the flat surface portion 16*a* corresponds to the "flat portion" in the claims.

As shown in FIG. 1, a rear end portion of the rear left portion 15*a*1 of the front frame 15 is connected to a front end portion of the left side frame 14*a* by welding. A rear end portion of the rear right portion 15*b*1 of the front frame 15 is connected to a front end portion of the right side frame 14*b* by welding. Further, the rear frame 16 is connected in a bridging manner between a right surface of the vertical plate part 14*a*1 of the left side frame 14*a* and a left surface of the vertical plate part 14*b*1 of the right side frame 14*b* by welding. A lower arm 14*a*3 that is a press-molded part of an iron plate is attached to an upper portion of the left surface of the vertical plate part 14*a*1 of the left side frame 14*a*. The back frame 21 is attached to the lower arm 14*a*3 via a recliner (not shown). A lower arm 14*b*3 that is a press-molded part of an iron plate is attached to an upper portion of the right surface of the vertical plate part 14*b*1 of the right side frame 14*b*. The back frame 21 is attached to the lower arm 14*b*3 via a recliner (not shown). In this way, the cushion frame 11 is formed as a substantially rectangular frame, as seen in a plan view.

Figure 2:
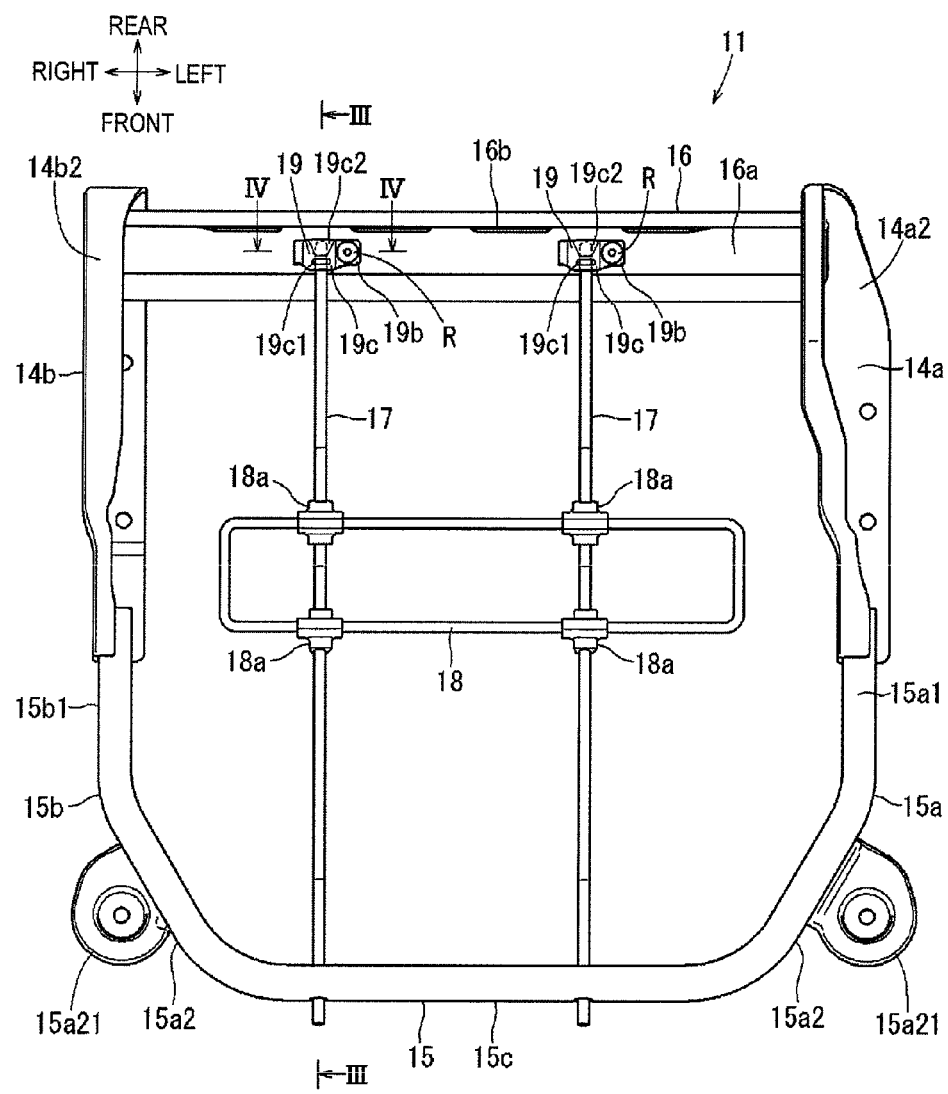
FIG. 2 is a plan view of a cushion frame in the above embodiment.
Figure 3:
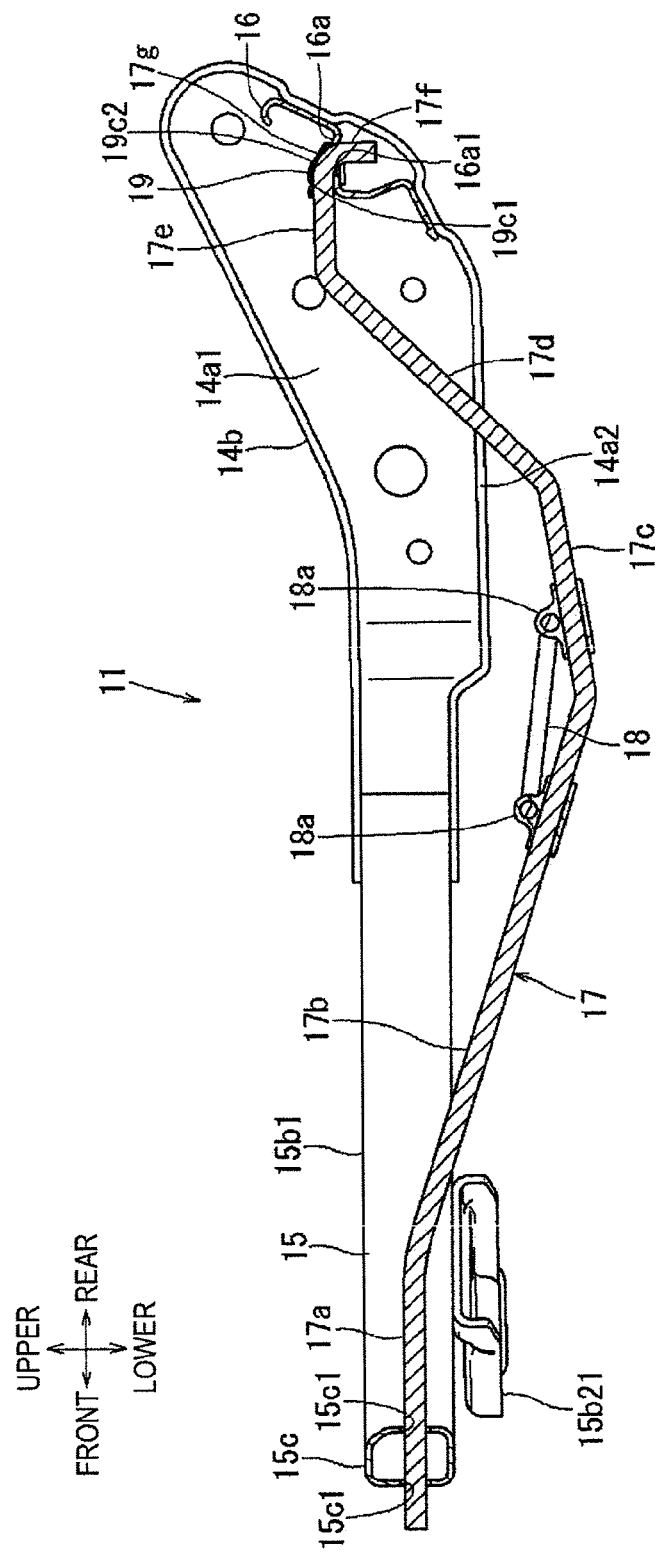
FIG. 3 is a sectional view taken along the line in FIG. 2.

As shown in FIGS. 1 to 4, between the front frame 15 and the rear frame 16, one pad support wire 17 extending in the front and rear direction is respectively disposed at bilaterally symmetrical positions with respect to the center line of the cushion frame 11 in the left and right direction. Each of the pad support wires 17 is a part formed by bending a columnar member made of aluminum and having a diameter of about 5 mm. As shown in FIG. 3, each of the pad support wires 17 has, from the front toward the rear, a front horizontal part 17*a*, a first inclined part 17*b*, a second inclined part 17*c*, a third inclined part 17*d*, a rear horizontal part 17*e*, and a bent portion 17*f*. The front horizontal part 17*a* is a part extending in the front and rear direction in parallel with the front frame 15, and a front end portion side thereof is inserted and held in a through hole 15*c*1 formed in the front portion 15*c* of the front frame 15. The first inclined part 17*b* is a part that extends rearward and downward from a rear end portion of the front horizontal part 17*a* to a substantially cello al portion of the cushion frame 11 in the front and rear direction. The second inclined part 17*c* is a part extending rearward and upward from a rear end portion of the first inclined part 17*b*, and the third inclined part 17*d* is a part extending rearward and upward from a rear end portion of the second inclined part 17*c* to a position higher than the front horizontal part 17*a*. The rear horizontal part 17*e* is a part extending rearward from a rear end portion of the third inclined part 17*d* in parallel with the front horizontal part 17*a*. The bent portion 17*f* extending downward is formed at a rear end portion of the rear horizontal part 17*e*. An R-shaped portion 17*g* is formed from an upper surface portion of the rear horizontal part 17*e* to a rear surface portion of the bent portion 17*f*. The bent portion 17*f* is inserted into the locking hole 16*a*1 formed in the flat surface portion 16*a* of the rear frame 16 and is locked in the state where a lower surface portion of the rear horizontal part 17*e* is in contact with an upper surface portion of the flat surface portion 16*a*. The diameter of the locking hole 16*a*1 is formed slightly larger than that of the pad support wire 17. Here, the pad support wire 17 and the locking hole 16*a*1 correspond to the "wire" and the "locking portion" in the claims, respectively.

Figure 4:
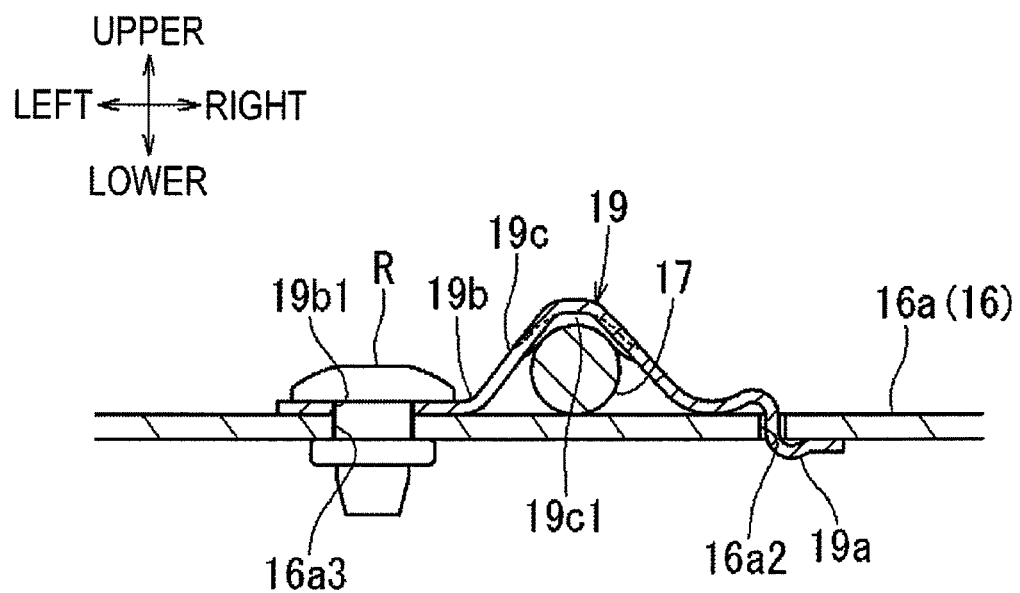
FIG. 4 is a sectional view taken along the line IV-IV in FIG. 2.

As shown in FIGS. 3 and 4, in the state where the bent portion 17*f* is inserted into the locking hole 16*a*1, a pressing piece 19 is attached to the flat surface portion 16*a* of the rear frame 16 so as to cover an upper surface of the rear end portion side of the rear horizontal part 17*e* and an upper surface of the R-shaped portion 17*g*. The pressing piece 19 is a plate part made of spring steel. In the state of being attached to the flat surface portion 16*a*, the pressing piece 19 has a substantially rectangular shape as seen in a plan view. A section of the pressing piece 19 taken along a plane extending in the left and right direction perpendicularly to the flat surface portion 16*a* has a mountain shape. A locking claw portion 19*a* is formed on one end portion side of the pressing piece 19, and a fastening portion 19*b* having a rivet hole 19*b*1 is formed on the other end portion side thereof. A mountain-like portion 19*c* is formed between the locking claw portion 19*a* and the fastening portion 19*b*. A ridge portion 19*c*1 extending in the front and rear direction and protruding downward is provided on a front lower surface of the mountain-like portion 19*c*, and an inclined portion 19*c*2 in contact with an upper surface of the R-shaped portion 17*g* is provided on a rear lower surface thereof. The mountain-like portion 19*c* covers the pad support wire 17 in the state where the locking claw portion 19*a* of the pressing piece 19 is inserted into a claw insertion hole 16*a*2 provided in the flat surface portion 16*a*. Further, the rivet hole 19*b*1 of the pressing piece 19 and the rivet hole 16*a*3 of the flat surface portion 16*a* are aligned in the state where a leading end portion of the ridge portion 19*c*1 is in contact with an upper surface of the rear horizontal part 17*e*. Then, a rivet R passes through the rivet holes 19*b*1, 16*a*3, thereby fastening and fixing the pressing piece 19 and the flat surface portion 16*a*. Here, the claw insertion hole 16*a*2 and the rivet hole 16*a*3 of the flat surface portion 16*a* are formed at substantially bilaterally symmetrical positions with respect to a line extending in the front and rear direction through the center of the locking hole 16*a*1. Here, the pressing piece 19 corresponds to the "separation preventing member" in the claims. Further, the claw insertion hole 16*a*2, the rivet R, and the inclined portion 19*c*2 correspond to the "hole", the "fastening member", and the "pressing portion" in the claims, respectively.

As shown in FIGS. 1 to 3, an auxiliary wire 18, which has a rectangular frame shape as seen in a plan view and extends across the first inclined parts 17*b* and the second inclined parts 17*c* of the left and right pad support wires 17, is attached to the first inclined parts 17*b* and the second inclined parts 17*c* by resin clips 18*a*. The auxiliary wire 18 is intended to support the left and right pad wires 17 so as not to move relative to each other in the left and right direction. Further, the auxiliary wire 18 is intended to stably support the cushion pad 12 with respect to the cushion frame 11 by being in contact with a lower surface of the cushion pad 12 in a wider area.

As shown in FIG. 1, the back frame 21 is configured to be assembled in a substantially inverted U shape, as seen in a front view. The back frame 21 is composed of two side frames 24 and an upper frame 25. The two side frames 24 are elongated in a longitudinal direction and form a framework of both left and right side portions of the seat back 20. The upper frame 25 is bridged between upper portions of both side frames 24 and form a framework of an upper portion of the seat back. Further, a lower panel 26 for increasing a structural strength of the back frame 21 is bridged and rigidly coupled between lower side portions of the both side frames 24. Each of the side frames 24 includes a main body part 24a formed by bending and drilling or the like an extrusion-molded product of aluminum, and a lower bracket 24b that is a press-molded product of a steel plate. Each lower bracket 24b is rigidly coupled to a lower end side of the main body part 24a and connected to a recliner (not shown). The upper frame 25 and the lower panel 26 are members formed by drilling or the like an extrusion-molded product of aluminum. The upper frame 25 is connected to upper end portion sides of both side frames 24 via brackets 27 by rivet-fastening. The lower brackets 24b are connected, together with the lower panel 26, to lower end portion sides of the main body parts 24a by rivet-fastening. A horizontal wire 28 for supporting the back pad 22 is bridged between the both side frames 24, and a vertical wire 29 is bridged between the upper frame 25 and the lower panel 26.

As shown in FIG. 1, the left lower bracket 24b and the right lower bracket 24b of the back frame 21 are attached to the lower arm 14a3 and the lower arm 14b3 of the cushion frame 11 via recliners (not shown), respectively. In this way, an inclination angle of the back frame 21 to the cushion frame 11 can be adjusted.

The present embodiment configured as described above has the following operational effects. The bent portions 17f are provided to the rear end portion sides of the pad support wires 17, and the locking holes 16a1 are provided in the flat surface portion 16a of the cushion frame 11. As the bent portions 17f are locked to the locking holes 16a1, the axial force applied to the pad support wires 17 can be transmitted in the in-plane direction of the flat surface portion 16a. Further, the pressing pieces 19 are attached to the pad support wires 17 so that the pad support wires 17 in this state are not separated from the flat surface portion 16a of the cushion frame 11. In this way, the pad support wires 17 can stably transmit the axial fore to the cushion frame 11, and thus, the attachment strength can be secured with a simple structure.

Further, the pressing pieces 19 cover the pad support wires 17. In the state where the locking claw portions 19a on the one end portion sides of the pressing pieces 19 are inserted into the claw insertion holes 16a2 of the flat surface portion 16a, the fastening portions 19b on the other end side thereof are fastened to the flat surface portion 16a by the rivets R. In this way, it is possible to prevent the pad support wires 17 from being separated from the flat surface portion 16a of the cushion frame 11 with a simple structure. Furthermore, when the pad support wires 17 are pressed against the flat surface portion 16a by the pressing pieces 19, the ridge portions 19c1 in line contact with the pad support wires 17 are abutted and pressed along the circumferential direction of the pad support wires 17. In this way, the pad support wires 17 tend to be pressed against the flat surface portion 16a uniformly along the outer periphery thereof, and thus, the separation of the pad support wires 17 from the flat surface portion 16a can be more reliably suppressed. In addition, the bent portions 17f of the pad support wires 17 are pressed against the front end portions of the locking holes 16a1 of the flat surface portion 16a in the direction of the axial force by the inclined portions 19c2. Therefore, the pad support wires 17 are attached to the cushion frame 11 without rattling.

Although specific embodiments have been described above, the disclosure is not limited to these appearances and configurations, and various modifications, additions and deletions can be made without changing the spirit of the disclosure. For example, the following can be exemplified.

1. In the above embodiment, the disclosure is applied between the cushion frame 11 and the pad support wire 17. However, the disclosure is not limited thereto. For example, the disclosure may be applied between the back frame 21 and the pad support wire. Further, the wire is not limited to the pad support wire, but a wire which is subjected to an axial force, such as a wire for locking a terminal portion of a seat cover to a frame, may be adopted.

2. In the above embodiment, the bent portion 17f is provided on the rear end portion side of the pad support wire 17. However, the disclosure is not limited thereto. For example, a diameter-enlarged portion obtained by crushing the rear end portion side of the pad support wire 17 may be adopted. Further, although the locking hole 16a1 is provided in the flat surface portion 16a, the disclosure is not limited thereto. A locking portion such as a concave portion with which the bent portion 17f or the diameter-enlarged portion is engaged may be provided.

3. In the above embodiment, the pad support wire 17 is pressed and held by the pressing piece 19 so as not to be separated from the flat surface portion 16a of the cushion frame 11. However, the disclosure is not limited thereto. For example, a member which is engaged with the lower end portion side of the bent portion 17f and is partially in contact with the lower surface of the flat surface portion 16a around the locking hole 16a1 to prevent the bent portion 17f from coming off from the locking hole 16a1 may be adopted as the separation preventing member.

4. In the above embodiment, the disclosure is applied to an automobile seat. However, the disclosure may be applied to a seat to be mounted on a vehicle such as an airplane, a ship or a train.

What is claimed is:

1. A vehicle seat comprising:
a seat frame including a flat part in which a locking portion is provided;
a wire connected to the seat frame and to which an axial force in an axial direction thereof is configured to be applied; and
a separation preventing member that is attached to the flat part, wherein
at least one of a bent portion and a diameter-enlarged portion is provided to at least one end portion of the wire,
the at least one of the bent portion and the diameter-enlarged portion is inserted into the locking portion such that the flat part of the seat frame is configured to receive the axial force transmitted from the wire in an in-plane direction of the flat part, and
the separation preventing member presses the wire against the flat part of the seat frame so as to prevent the wire from being separated from the flat part in a state where the at least one of the bent portion and the diameter-enlarged portion is inserted into the locking portion.

2. The vehicle seat according to claim 1, wherein
the separation preventing member is a plate member which covers the wire, and both ends of the separation preventing member are connected to the flat part.

3. The vehicle seat according to claim 2, wherein
the flat part has a hole, and
one end portion of the separation preventing member is inserted into and locked to the hole, and another end portion of the separation preventing member is fastened to the flat part by a fastening member.

4. The vehicle seat according to claim 3, wherein
the flat part has a second hole,
the another end portion of the separation moving member has a hole, and
the fastening member is a rivet which is inserted into the second hole of the flat part and the hole of the separation preventing member so as to fasten the another end portion of the separation preventing member to the flat part.

5. The vehicle seat according to claim 2, wherein
the separation preventing member includes a ridge portion in line and in contact with the wire along a circumferential direction of the wire to cover the wire.

6. The vehicle seat according to claim 2, wherein
the separation preventing member is provided with a pressing part which is in contact with the wire when the separation preventing member is attached to the flat part with the wire interposed therebetween and which presses the at least one of the bent portion and the diameter-enlarged portion of the wire against the locking portion of the flat part in the axial direction of the axial force.

7. The vehicle seat according to claim 1,
wherein the wire is a pad support wire which supports a cushion pad serving as a cushion material of the vehicle seat, and the flat part is a panel member.

8. The vehicle seat according to claim 1,
wherein the locking portion is a through hole, and the at least one of the bent portion and the diameter-enlarged portion penetrates through the through hole.

9. The vehicle seat according to claim 1,
wherein the at least one of the bent portion and the diameter-enlarged portion extends in a direction intersecting the flat part of the seat frame.

10. The vehicle seat according to claim 1,
wherein one end portion of the separating preventing member is connected to a first portion of the flat part of the seat frame,
wherein another end portion of the separating preventing member opposite to the one end portion is connected to a second portion of the flat part of the seat frame, and
wherein the locking portion is provided between the first portion and the second portion.

* * * * *